(12) United States Patent
Li et al.

(10) Patent No.: US 8,267,322 B2
(45) Date of Patent: Sep. 18, 2012

(54) METHOD AND APPARATUS FOR CORRECTING DECODING ERRORS IN MACHINE-READABLE SYMBOLS

(75) Inventors: Jia Li, Aurora (CA); Mikhail Brusnitsyn, North York (CA); Eunice Poon, Markham (CA); Seungsik Kwak, Oakville (CA); Guoyi Fu, Toronto (CA)

(73) Assignee: Seiko Epson Corporation, Tokyo (JP)

( * ) Notice: Subject to any disclaimer, the term of this patent is extended or adjusted under 35 U.S.C. 154(b) by 375 days.

(21) Appl. No.: 12/719,379

(22) Filed: Mar. 8, 2010

(65) Prior Publication Data

US 2011/0215151 A1    Sep. 8, 2011

(51) Int. Cl.
*G06K 7/10*    (2006.01)
(52) U.S. Cl. .................................................. 235/462.1
(58) Field of Classification Search ............. 235/462.16, 235/462.01, 462.25, 462.08, 462.1
See application file for complete search history.

(56) References Cited

U.S. PATENT DOCUMENTS

| | | | |
|---|---|---|---|
| 5,352,878 A | 10/1994 | Smith et al. | |
| 7,213,761 B2 | 5/2007 | Liu | |
| 7,242,816 B2 | 7/2007 | Attia et al. | |
| 2004/0004128 A1 | 1/2004 | Pettinelli et al. | |
| 2005/0082370 A1 | 4/2005 | Frantz et al. | |
| 2006/0043189 A1* | 3/2006 | Agrawal et al. .......... | 235/462.08 |
| 2007/0228171 A1 | 10/2007 | Thiyagarajah | |

FOREIGN PATENT DOCUMENTS

JP    2009-076031    4/2009

OTHER PUBLICATIONS

A New Binarization Method for PDF417 Bar Code by Camera Phone, Quanqin Xiao, Mingjun Liu, and Yue Liu, School of Information Science and Engineering, University of Jinan, Jinan, Shandong Province, China, Proceedings of the IEEE International Conference on Automation and Logistics, Qingdao, China, Sep. 2008, (pp. 1904-1908).
Research on Two-Dimensional Bar Code Positioning Approach Based on Convex Hull Algorithm, Zhi Liu, Herong Zheng and Wenting Cai, Software College, Zhejiang University of Technology, Hangzhou, China, 2009 International Conference on Digital Image Processing, Mar. 7-9, 2009, (pp. 177-180).

* cited by examiner

*Primary Examiner* — Thien M Le
*Assistant Examiner* — Sonji Johnson

(57) ABSTRACT

The present invention is a system and method for decoding an image of a bar code. Decoding the barcode includes tokenizing a plurality of pixels in the image of the barcode based upon a plurality of thresholds to form a first set of tokens. Decoding the barcode also includes re-tokenizing the plurality of pixels in the image of the barcode based upon the intensity of the pixels in the plurality of tokens, and the relativity intensity of neighboring tokens, to form a second set of tokens.

12 Claims, 6 Drawing Sheets

METHOD AND APPARATUS FOR CORRECTING DECODING ERRORS IN MACHINE-READABLE SYMBOLS

CROSS-REFERENCE TO RELATED APPLICATION(S)

This application is related to U.S. patent application entitled "Method and Apparatus for Creating Pixel Tokens from Machine-Readable Symbols to Improve Decoding Accuracy in Low Resolution Images," Ser. No. 12/719,370, filed on the same day as the present application, which is incorporated by reference in its entirety.

BACKGROUND

1. Field of Invention

The present application is directed towards systems and methods for decoding barcodes.

2. Description of Related Art

Machine-readable symbols, often referred to as barcodes, are widely seen in daily life. They provide information about products, parcels, tickets, etc. One type of barcode is the one-dimensional (1D) barcode made up straight dark lines with varying widths and spaced at varying intervals. Information may be encoded in the width of the bars and the width of the spaces. FIG. 1 is an illustration of a meal ticket that includes a barcode. There exist a number of methods to locate and decode 1D and 2D barcodes.

One such method of decoding a barcode is described in U.S. Pat. No. 5,073,954 issued to Richard G. VAN TYNE et al. in which the barcode is located by summing the black pixels in segments with a predetermined width along each horizontal scan line. The location of a barcode is identified using L pattern characteristic found in histograms of barcode POSTNET images. Once a barcode region is located the black pixels are summed up for each vertical scan line. A threshold value proportional to the average maxima of these sums is used to determine the location and width of black bars producing a binary code. This barcode locating and decoding method was suitable for certain types of barcode such as the POSTNET code which contains full-height bars and half-height bars with known image width. This method also assumes the black pixels in the image are pre-determined before the barcode detection operation and the definition of black does not change.

A more general barcode decoding method that can be applied to all types of barcodes without requirement on bar width has been described in U.S. Patent Application No. 2006/0050961 issued to Mohanaraj THIYAGARAJAH. This method scans the image line-by-line without prior knowledge of the barcode location. Each horizontal scan-line is segmented into black or white pixel groups or tokens. This step is referred to as tokenization, which consists of converting image pixels to either black or white (non-black) and grouping continuous black or white pixels. Bars are represented by adjacent black pixels. Spaces are represented by adjacent white pixels. Bars may be denoted by zeroes and spaces by ones. The image of the current scan line is converted to an array of interlaced zeroes and ones. Every bar or space is a token. The width of each token is measured in units of image pixels and later used in the decoding step. This prior art method states that a method of adaptive thresholding may be used to distinguish black and white pixels from a grayscale image, but does not provide any details on how it might be implemented.

After tokenization barcode start or stop patterns are searched for in the sequence of tokens. If a pattern is found, multi-stage verification is carried out to verify that the detected signature pattern is correct and therefore can indicate presence of a barcode candidate.

Decoding may start once a signature pattern is verified. The goal is to generate codes from the tokens and look them up in a barcode dictionary. The decoding step stops before reaching the end of the token list when an erroneous code is generated or stop pattern or reversed start pattern is found.

Another method for decoding barcodes is described in U.S. Pat. No. 4,998,010 issued to Donald G. CHANDLER et al. This patent describes a method of detecting a barcode region by first using properties of spacing and directionality of the barcode. Frequency analysis is performed on an entire image in an attempt to find the region with barcode patterns. After the barcode region is found, a similar processing including tokenization and decoding is carried out inside the barcode region.

The print quality of a barcode depends on the printer, the paper, and the ink. The bars and spaces of the barcode may not have a uniform image intensity or color. This may be due to deterioration the paper or ink from use or folding. Stains may also change the intensity or color of some of the bars and spaces. When a barcode is printed on low quality paper the ink can easily spread changing widths of the bars and spaces. Tokens generated from such barcodes could have errors. Some of the token widths may be incorrect, or the number of tokens may be incorrect. Since the barcode location procedure does not require correct segmentation of all tokens in order to succeed, inaccuracies in tokenization may not be revealed until decoding is performed.

The above methods have trouble decoding barcodes of poor quality. The present invention is a method for correcting errors in the decoding step when the source data has errors.

SUMMARY OF INVENTION

The present invention is directed towards systems and methods for decoding an image of a bar code. Decoding the barcode includes the following steps: a) tokenizing a plurality of pixels in the image of the barcode based upon at least an initial fixed set of intensity thresholds to form a first set of tokens, said first set of tokens including white tokens identifying decoded white spaces in the image and black tokens identifying decoded black bars in the image; (b) re-tokenizing the plurality of pixels in the image of the barcode based upon a first new set of thresholds determined from the intensity of pixels in the first set of tokens, and the relativity intensity of one of its neighboring re-tokenized tokens, to form a second set of tokens.

In an embodiment of the present invention the plurality of thresholds are independent of the intensity of pixels in the image of the barcode. It is further presently preferred that step (b) include: (i) identifying the brightest pixel in each of the white tokens; (ii) identifying the darkest pixel in each of the black tokens; (iii) defining a first new upper threshold, $t_2$, to be a fixed amount lower than an upper reference, $T_w$, defined as the darkest pixel among said brightest pixels; (iv) defining a first new lower threshold, $t_1$, to be a fixed amount higher than a lower reference, $T_b$, defined as the brightest pixel among said darkest pixels, said first new upper threshold and new lower threshold forming said first new set of thresholds; wherein said first new set of thresholds are used in said re-tokenizing of the plurality of pixels in the image of the barcode.

In an embodiment of the present invention re-tokenizing the plurality of pixels in the image of the barcode is further based upon a second new set of thresholds determined from the intensity of pixels in the first set of tokens. It is noted that the second set of thresholds includes a second new upper threshold, $t_2'$, defined as the upper reference $T_w$ less said first predefined fraction of the intensity difference between the upper reference $T_w$ and the lower reference $T_b$. Also, the second set of thresholds includes a second new lower threshold, $t_1'$, defined as the lower reference $T_b$ plus a first predefined fraction of the intensity difference between the upper reference $T_w$ and the lower reference T.

In an embodiment of the present invention, re-tokenizing further includes: defining a first contrast threshold, C, as a second predefined fraction of the intensity difference between the upper reference $T_w$ and the lower reference $T_b$; and comparing an intensity difference between a particular pixel and an assigned intensity of a neighboring token, to said first contrast threshold C. Preferably, it is validated that the first set of tokens represents a valid barcode, and the plurality of pixels are only re-tokenized if the barcode is valid. This validating may include verifying that the image of the barcode meets a plurality of criteria, where the criteria includes a vertical intensity variability of each token; a between token contrast level; and a total vertical intensity of the barcode.

An embodiment of the present invention may be a computer-readable medium encoded with instructions for decoding a barcode. An embodiment of the present invention may be a system that includes a processor and memory for decoding a barcode. An embodiment of the present invention may be a system for decoding a barcode and includes a scanner for obtaining the image of the barcode.

An embodiment of the present invention may be a system and method for decoding a barcode. Decoding the barcode includes identifying a barcode candidate within an image consisting of an array of pixels. Decoding the barcode includes tokenizing the array of pixels into a plurality of initial black tokens and a plurality of initial white tokens using a plurality of initial thresholds. The plurality of initial tokens consists of the initial black tokens and the initial white tokens.

Decoding the barcode includes identifying an intensity of the brightest pixel among each of the plurality of initial white tokens, and selecting as a first tokenization parameter the lowest intensity among the identified brightest pixels. Decoding the barcode also includes identifying an intensity of the darkest pixel among each of the plurality of initial black tokens, and selecting as a second tokenization parameter the highest intensity among the identified darkest pixels. Decoding the barcode includes calculating a tokenization contrast parameter that is proportional to two-thirds of the difference between the first tokenization parameter and the second tokenization parameter. Decoding the barcode includes calculating a third tokenization parameter as equal to slightly more than the second tokenization parameter. Decoding the barcode includes calculating a fourth tokenization parameter as equal to slightly less than the first tokenization parameter.

Decoding the barcode includes calculating a fifth tokenization parameter as equal to the sum of 0.75 times the first tokenization parameter and 0.25 times the second tokenization parameter. Decoding the barcode includes calculating a sixth tokenization parameter as equal to the sum of 0.25 times the first tokenization parameter and 0.75 times the second tokenization parameter.

Decoding the barcode includes identifying a pixel as a black pixel if an intensity of the pixel is less than the third tokenization parameter or if the intensity of the pixel is less than the sixth tokenization parameter and difference between the intensity of the previous token and the intensity of the pixel is greater than the tokenization contrast parameter.

Decoding the barcode includes identifying a pixel as a white pixel if an intensity of the pixel is greater than the fourth tokenization parameter or if the intensity of the pixel is greater than the fifth tokenization parameter and a difference between the intensity of the previous token and the intensity of the pixel is greater than the tokenization contrast parameter.

An embodiment of the present invention is a system and method for decoding an image of a barcode. Decoding an image of a barcode includes tokenizing a plurality of pixels in the image of the barcode based upon a plurality of thresholds to form a first set of tokens.

Decoding an image of a barcode also includes decoding the first set of tokens to form a first code. Decoding an image of a barcode further includes instructions for verifying that the first code is a valid barcode.

Decoding an image of a barcode includes re-tokenizing the plurality of pixels in the image of the barcode based upon the intensity of the pixels in the plurality of tokens, and the relativity intensity of neighboring tokens, to form a second set of tokens, if the first code is not a valid barcode.

Other objects and attainments together with a fuller understanding of the invention will become apparent and appreciated by referring to the following description and claims taken in conjunction with the accompanying drawings.

BRIEF DESCRIPTION OF THE DRAWINGS

In the drawings wherein like reference symbols refer to like parts.

DESCRIPTION OF THE PREFERRED EMBODIMENTS

The present invention is a system and method for decoding barcodes. The present invention provides a method for decoding the barcode when the image is noisy. The image may be noisy due to the area of the barcode being dirty, smudged, because it was produced using a low quality printing process or a low quality printing surface.

Figure 1:
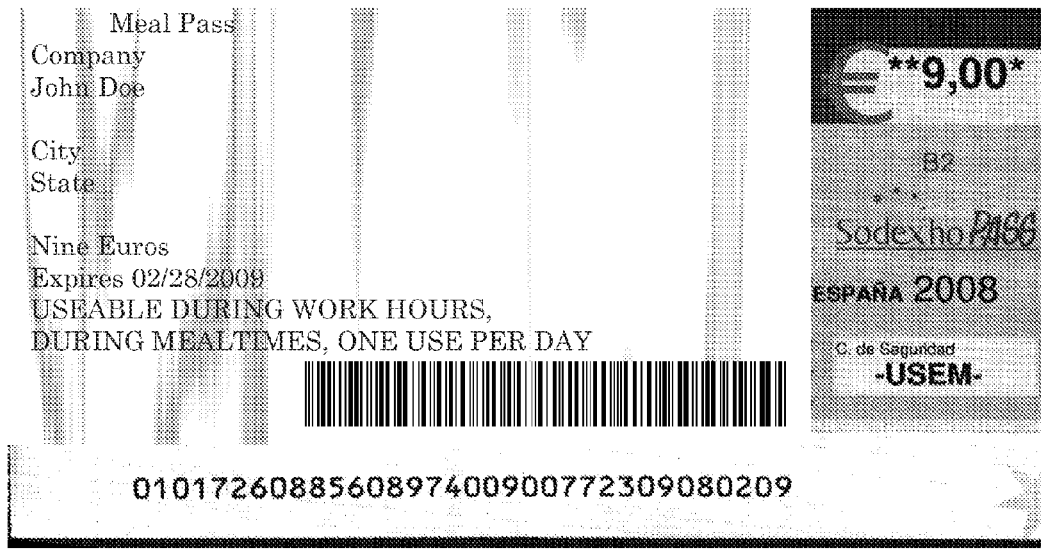
FIG. 1 is an illustration of an item that includes a barcode that an embodiment of the present invention may be used to read.
Figure 2:
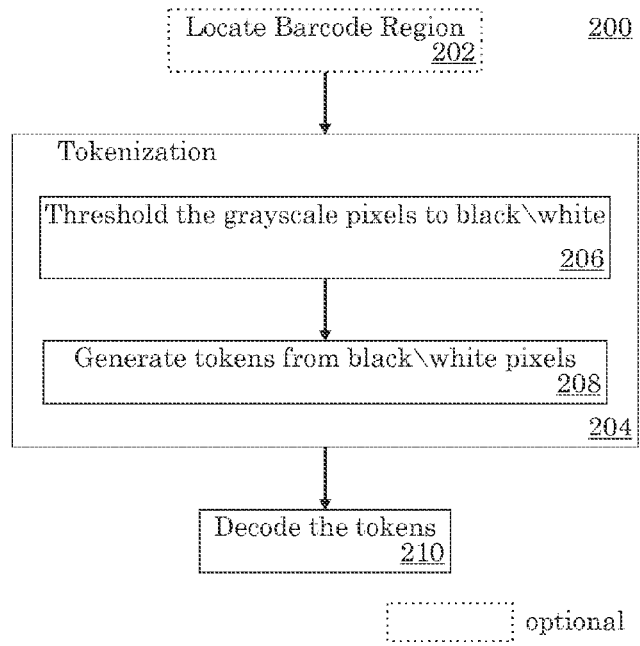
FIG. 2 is an illustration of a portion of a method of decoding barcodes as used in an embodiment of the present invention.

FIG. 2 is a summary of a general method 200 for decoding barcodes. An optional first step may include locating the barcode region in a step 202. In an alternative embodiment of the present invention, the location of the barcode may be already known.

Decoding barcodes also include a tokenization step 204. The tokenization step may include thresholding grayscale pixels to segregate them into groups of black pixels and groups of white pixels in a step 206. In a step 208 black tokens and white tokens maybe generated from the groups of pixels. In a step 210, the tokens are decoded.

An embodiment of the present invention improves upon prior art methods of decoding barcodes by adding a decoding refinement step that corrects for errors in the barcode. The refinement step may include a second tokenization step that is applied to select grayscale image pixels. The refinement step may be invoked when the decoding fails after a specific minimum number of tokens. In an alternative embodiment of the present invention a verification method is also used to exclude non-barcode regions, which may be of particular use when barcode region detection is not performed before tokenization.

The decoding method may fail because the tokenization process uses incorrect threshold levels for pixel intensity and/or color even though all the bars are visible and clear in the barcode image. Assume two threshold values $t_1$ and $t_2$, in which $t_1$ is less than or equal to $t_2$ ($t_1 \leq t_2$), are used in the tokenization process. When $t_1=t_2$, the results are equivalent to using a single threshold. Pixels with an intensity and/or color less than $t_1$ are determined to be black and those having intensity and/or color greater than $t_2$ are considered to be white. The pixels that fall between the two thresholds are judged at a latter point to be either black or white depending on their pixel value and their relative location to either black or white pixels. In prior art methods the thresholds are typically predefined fixed values. Unfortunately fixed thresholds can not handle all barcode images especially those with a large variation in brightness. An alternative method for setting thresholds includes using the entire image of the article containing the barcode and obtaining global thresholds. In either case the thresholds may not be accurate enough to generate a correct token list and therefore needs to be updated.

Figure 3A:
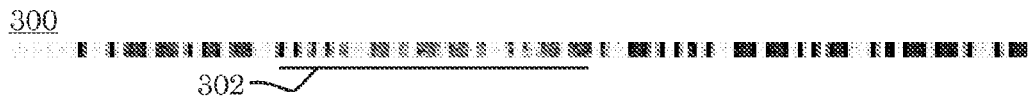
FIGS. 3A-B are illustrations of bar codes that an embodiment of the present invention may decode with higher accuracy than prior art methods.
Figure 3B:
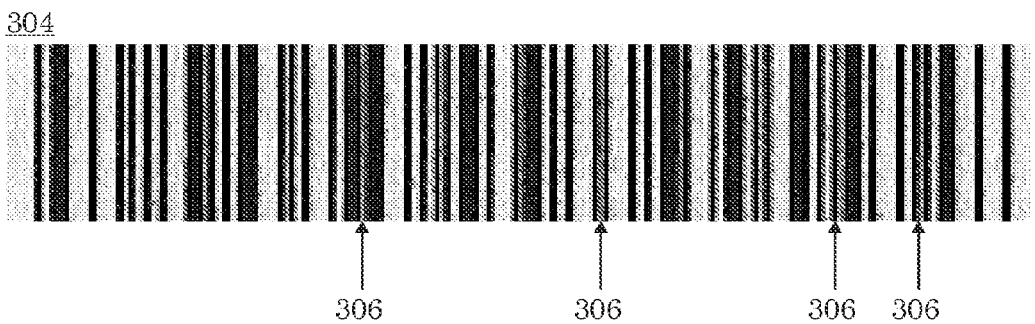

Image noise and distortion in an image of a barcode 300 shown in FIG. 3A can cause incorrect tokens to be generated. For instance the bars in region 302 are brighter than the rest of the bars in barcode 300. Prior art methods would falsely determine the bars in this region to be white spaces. FIG. 3B is an illustration of a bar code 304 that has a few very narrow white spaces 306 that are much darker than other wider, white space within the bar code 304. These narrow white spaces 306 may be misidentified as part of black bars when prior art methods are used. In both examples 300 and 304 an incorrect sequence of digital codes are produced, which results in a decoding failure or produces a bad code if prior art methods are used.

Figure 4:
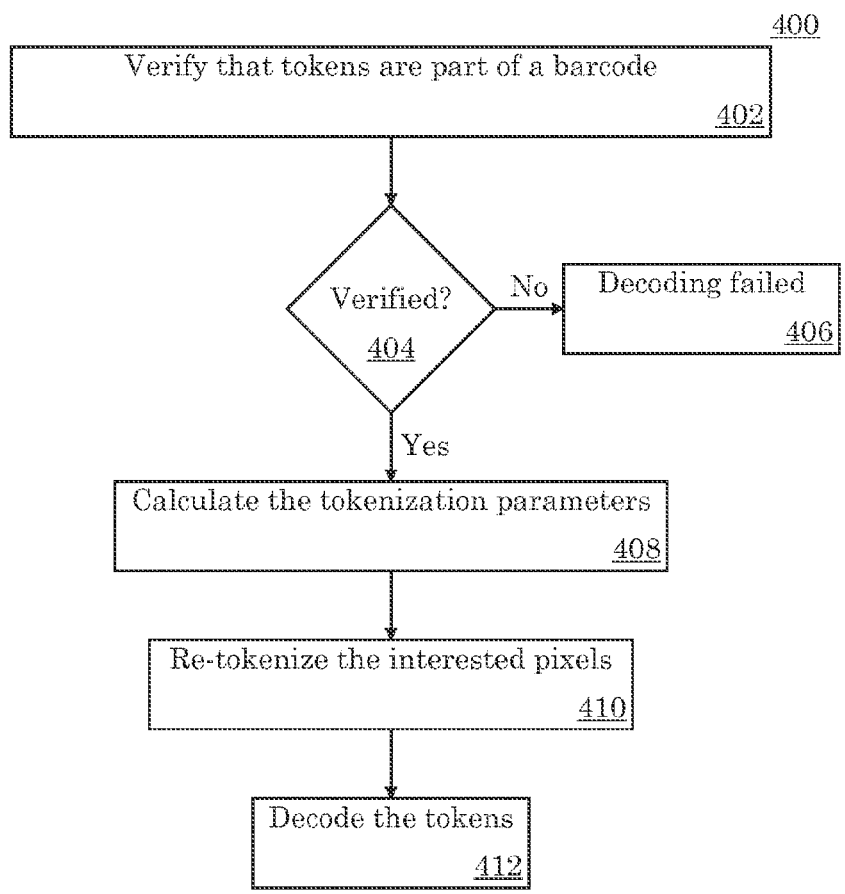
FIG. 4 is a flow chart illustrating a barcode correcting method that may be used in an embodiment of the present invention.

FIG. 4 is a flow chart illustrating a barcode correcting method 400 that may be used in an embodiment of the present invention. A first step 402 may be to verify that the decoded tokens are a barcode, as opposed to other text or images that may be on the item being scanned. A step 404 is a branching point in the barcode correcting method. If the tokens cannot be verified to have been decoded from an actual barcode, then the decoding should not be performed and the barcode correcting method goes on to step 406. If the barcode is verified (step 404=Yes), then the barcode correcting method continues to step 408, which may include updating the tokenization parameters to fit the measured intensity and/or color distribution of the barcode. A step 410 may include re-tokenizing the pixels inside the located barcode region or those following the decoded tokens to create a new list of tokens. In a step 412 these new tokens may be fed into a decoding module to correct the previous decoding errors.

Token Verification

An item being scanned for a barcode invariably includes one or more background images in addition to the barcode. Tokens may be inadvertently produced form these background images. In addition, it is possible for tokens produced from background images to match a start and/or stop pattern. Therefore, it is necessary to verify that the tokens are from an actual barcode. Many barcode specifications suggest checking for the presence of quiet zones (large white spaces) at both ends of the barcode. Quiet zones vary with barcode type, but typically their width is defined relative to the narrowest bar. For example, a quiet zone may be defined as 10 times wider than the narrowest bar width, i.e. token width. However, in cases where refinement is needed, the token widths calculated from existing tokens may also be incorrect. Moreover, checking for quiet zones, by itself, is not sufficient to remove all false barcode candidates.

The symbol decoding method disclosed by U.S. Pat. No. 6,941,026 issued to Sateesh Gopalakrishna NADABAR describes a variance-based filter for distinguish which coarsely located rectangle is likely to contain a symbol. A variance based analysis includes dividing each candidate location into a plurality of zones. An initial variance is calculated for each zone. A total variance of the initial variances is also calculated. A sum of the initial variances is also calculated. Q values are determined as being equal to the sum of the initial variance divided by the total variance candidate locations. Q values less than a threshold value are discarded.

An embodiment of the present invention may include a variance-based verification method when a coarse location of the barcode is unavailable, which is distinct from those in the prior art.

Figure 5:
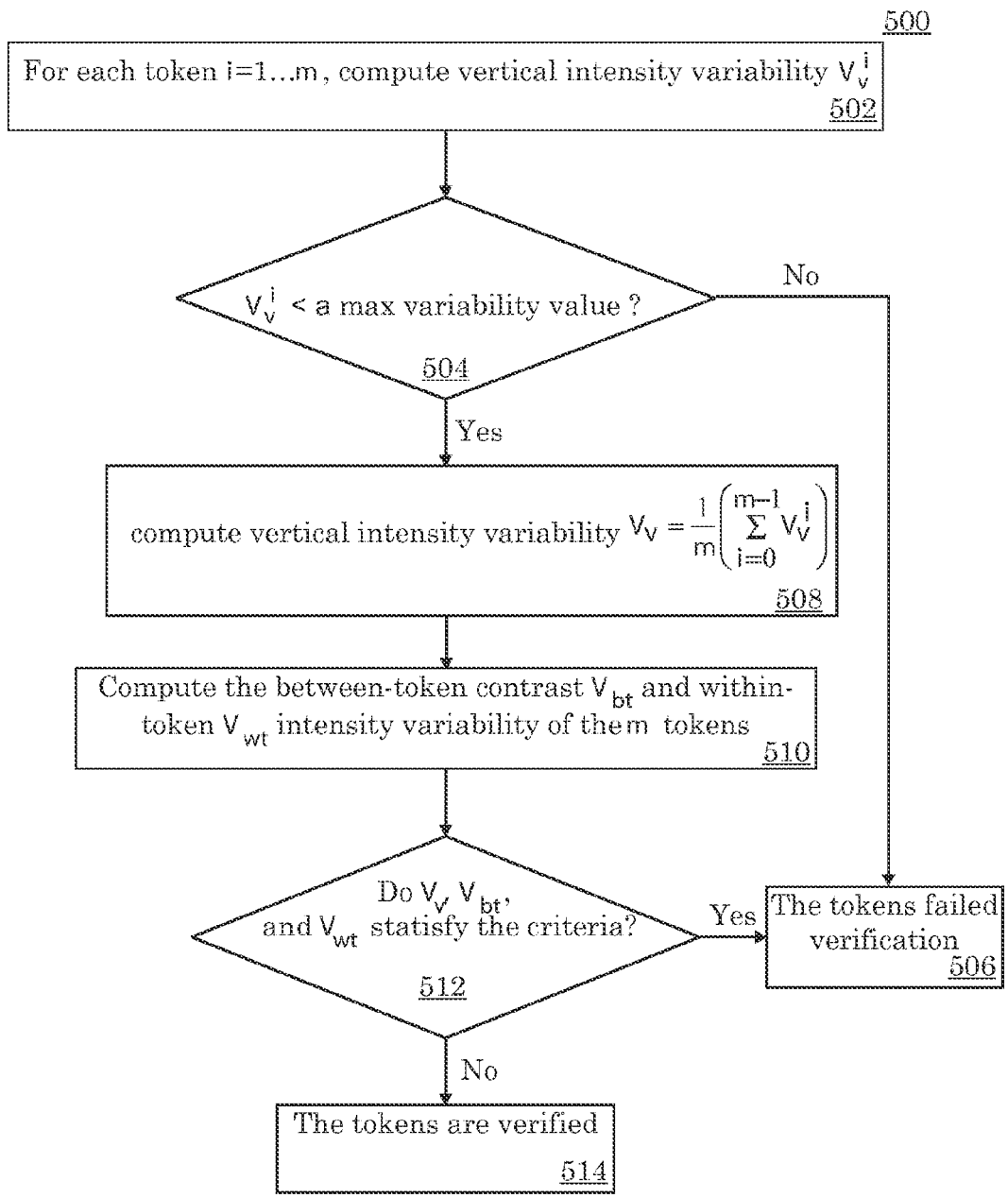
FIG. 5 is a flowchart of illustrating a method of verifying a barcode that may be used in an embodiment of the present invention.

FIG. 5 is a flowchart illustrating a method 500 for verifying a barcode that may be used in an embodiment of the present invention. An initial step that may be preformed prior to verification method 500 may include detecting a barcode candidate. A candidate barcode may include a possible start pattern and/or a possible stop pattern. The candidate barcode may include m tokens. The verification method 500 involves the calculation of three measurements. The vertical intensity variability in the image height dimension may be related to a standard deviation of the token pixel intensities on a number of adjacent lines. Applicants have found that when the vertical intensity variability is low, the probability that candidate barcode is a true barcode is high. Applicants have also found that the average between-token contrast is a useful measurement for identifying barcodes. The average between-token contrast is an average of absolute intensity difference of adjacent bars and spaces. In addition, Applicants have found that the within-token variability is a useful measurement for identifying barcodes. The within-token variability is an average absolute intensity difference of adjacent pixels of all examined tokens. Applicants have found that these three measurements taken together are useful for identifying barcodes.

Figure 6:
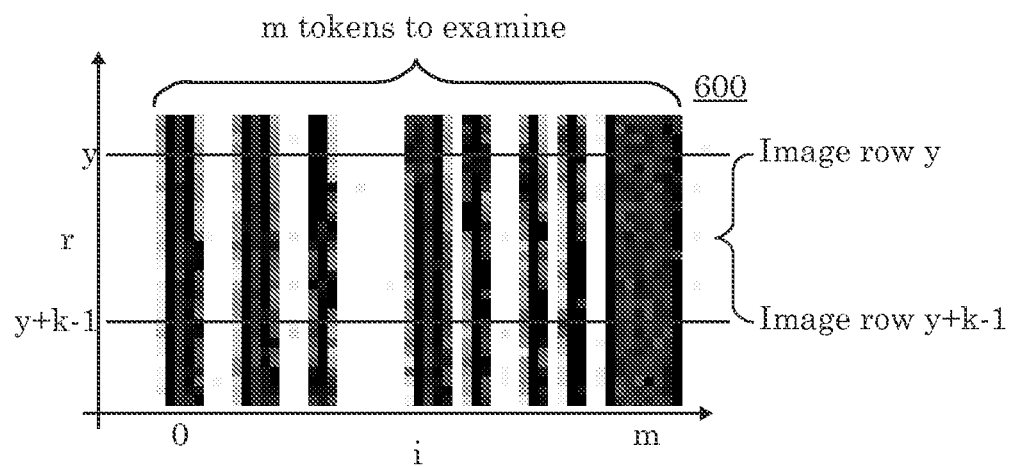
FIG. 6 is an example of a barcode that an embodiment of the present invention may be used to decode.

FIG. 6 is an example of a barcode 600 that an embodiment of the present invention may be used to decode. A barcode consists of an array of pixels. The average intensity I of each pixel at row r and token i may be identified as $I_i^r$, as stated in equation (1), below. Each token, which spans the width of a black bar within a row, may consist of one or more columns.

A first step in computing the three measurements discussed above is to set a number of k image rows.

The number k of image rows is a design choice. In one embodiment of the present invention, the barcode is divided into 11 image rows. However, since the top two rows and the bottom two rows may overlap a background image, it is presently preferred that these two top rows and two bottom rows be omitted. Therefore, in the presently preferred embodiment, k is seven image rows.

The k image rows span multiple adjacent lines, and would preferably span the entire length of barcode 600. However, if barcode 600 suffers from a large rotation skew error, has a tear/break in its barcode pattern, or is in some other way distorted, then it is recommended that fewer lines be used (i.e. that k not span the entire length of barcode 600). It is to be understood that the span of k is dependent upon the extent of uncorrected, barcode distortion. However, reducing the number of scan lines may not be sufficient to counteract very large skew angle. If a very large angle is detected, one of the following methods should be applied: (1) rotate the image to eliminate the skew or (2) use inclined lines perpendicular to the bars.

$$I_i^r : r = 0 \ldots k-1 \text{ and } i = 0 \ldots m-1 \quad (1)$$

A step 502 in the verification method is to compute the vertical intensity variability $V_v^i$ of each interested token i, as described in equation (2). For the i-th token, the variability value is the standard deviation of the pixel intensity across k image rows of token i.

$$V_v^i = \sqrt{\frac{\sum_{r=0}^{k-1}(I_i^r - \overline{I_i})^2}{k-1}} \quad (2)$$

As used in equation (2), the average intensity of a token i ($\overline{I_i}$) is the average intensity of the pixels in token i across k rows. In an embodiment of the present invention, $V_v^i$ may be calculated without performing a square root. In an embodiment of the present invention, $V_v^i$ may be calculated without dividing by k−1. In a step 504, $V_v^i$ is compared to a maximum variability threshold. If token i exceeds the maximum variability threshold, then token i is judged to have failed a verification step and verification method 500 ends at step 506. When all m tokens have passed the vertical variability check in step 504, the overall vertical variability $V_v$ of m tokens is calculated as the average of the variability value of each token as stated in equation (3) in a step 508.

$$V_v = \frac{1}{m}\left(\sum_{i=0}^{m-1} V_v^i\right) \quad (3)$$

A step 510 may include calculating a between token contrast value $V_{bt}$ over m tokens as stated in equation (4). This will calculate the average contrast between neighboring tokens, which the applicants have found to be a good indicator that the candidate barcode is a valid barcode.

$$V_{bt} = \frac{1}{m-1}\sum_{i=0}^{m-2}|\overline{I_i} - \overline{I_{i+1}}| \quad (4)$$

Recalling that ($\overline{I_i}$) is the average intensity of a token i (defined as the average intensity of the pixels in token i across k rows), and assuming that the j-th pixel column in the i-th token has an average intensity $\overline{P_j^i}$ across k image rows, such that $\overline{P_j^i}$ is a column-wise average intensity, then the within-token variability may be determined as:

$$V_{wt} = \frac{1}{m}\sum_{i=0}^{m-1}\frac{1}{n}\sum_{j}^{j=n-1}|\overline{P_j^i} - \overline{I_i}| \quad (5)$$

Alternatively, the within-token variability may also be determined as shown below, but the method of equation (5) currently preferred:

$$V_{wt} = \frac{1}{m}\sum_{i=0}^{m-1}\frac{1}{n-1}\sum_{j=1}^{n-1}|\overline{P_j^i} - \overline{P_{j-1}^i}|$$

In a step 510, $V_v$, $V_{bt}$, and $V_{wt}$ are checked against a plurality of rules to verify that the candidate tokens represent a barcode. The plurality of rules may take many forms. An example of a plurality of rules that may be used in an embodiment of the present invention are described in equation (6).

$V_u <$ the maximum vertical variablity $V_{bt} < V_{wt}$ ratio1(ratio1>1)

$V_{bt} < V_v$ ratio2(ratio2>1) \quad (6)

These rules have three parameters, the maximum vertical variability, ratio1, and ratio2. Sample barcodes may be analyzed to obtain these three parameters. Typical classification methods such as: neural networks; SVM; linear analysis; and other methods well known in the art, may also be used as an alternate method of creating rules to identify barcodes.

Figure 7:
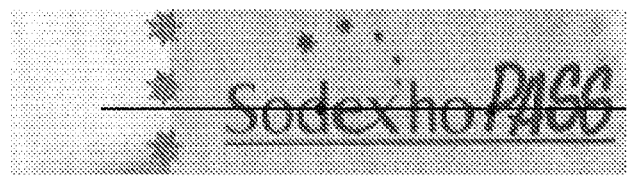
FIG. 7 is an illustration of a false barcode.

This verification method 500 may be used to exclude false candidate tokens, such as the one shown in FIG. 7, as barcodes. For example, an initial analysis of the image in FIG. 7 will identify tokens of a candidate barcode along the line passing through the text shown in FIG. 7. An initial analysis also identifies start and stop patterns as the dots on the line in FIG. 7.

Updating Tokenization Parameter

An embodiment of the present invention may be used to analyze an image to identify m tokens and verify that they are part of a barcode. A reason for updating the tokenization parameters (i.e. the initial intensity thresholds, $t0_1$ in $t0_2$, used to identify white spaces and black bars, respectively) is that the currently decoded tokens are suspected of containing token decoding errors (i.e. white spaces being erroneously identified as part of a black bar token, and/or a black bars being erroneously identified as being part of a white space token). In other words, it is likely that these token decoding errors are due to the original intensity threshold levels $t0_1$ in $t0_2$ not being suitable for identifying all white spaces and all black bars in the currently scanned barcode. An objective is therefore to define new intensity threshold levels that are better suited for the currently scanned barcode.

To define new intensity threshold levels, one first determines the minimum intensity contrast between the scanned white spaces and the scanned black bars that were decoded using the original intensity threshold levels. It should be noted, however, that since the original threshold levels may have resulted in token decoding errors, the decoded tokens being used to determine the minimum intensity contrast might not reflect all true white spaces and all true black bars in the actual barcode. Thus, it is likely that determined minimum intensity contrast between the decoded white tokens (corresponding to identified white spaces) and the decoded black tokens (corresponding to identified black bars) will not reflect the true minimum intensity contrast between all the true white spaces and all the true black spaces of the actual barcode. An example of this is provided below with reference to FIG. 8.

Assuming that m tokens have been decoded, the tokens are segmented into: white tokens (for white spaces); and black tokens (for black bars). One searches the upper bound of the intensity range by identifying the brightest pixel in each of the white tokens. The intensities of these brightest pixels are then sorted, and the lowest intensity value (denoted as $T_w$) determines the upper boundary of the minimum intensity contrast between the decoded white spaces and the decoded black bars.

The lower bound of the intensity range is determined by identifying the darkest pixel in each of the decoded black tokens. The intensities of these darkest pixels are then sorted, and the highest intensity value (denoted as $T_b$) determines the lower boundary of the minimum intensity contrast between the decoded white spaces and the decoded black bars.

The difference between $T_w$ and $T_b$ defines the intensity contrast between the white spaces and the black bars of the decoded tokens, and can therefore be estimated as $(T_w-T_b)$.

A contrast threshold C (a new parameter related to the minimum intensity contrast) can now be defined using equation (7).

$$C=2/3(T_w-T_b). \quad (7)$$

The original thresholds $t0_1$ and $t0_2$ that were used in the initial tokenization may now be updated to create a first new set of thresholds $t_1$ and $t_2$ according to equations (8) and (9), below, using contrast parameters $T_w$ and $T_b$ to assure that $t_1$ and $t_2$ lie within the intensity contrast range between the decoded white spaces and the decoded black bars.

$$t_1=T_b+1 \quad (8)$$

$$t_2=T_w-1 \quad (9)$$

Although the first new set of thresholds $t_1$ and $t_2$ are suitable for distinguishing between the decoded white spaces and decoded black bars, they may not be suitable for identifying all true white spaces and all true black bars in the actual barcode if the original threshold levels $t0_1$ and $t0_2$ resulted in token decoding errors. Therefore, it is preferred that a second new set of thresholds $t_1'$ and $t_2'$, which are dependent upon the determined minimum intensity contrast difference $(T_w-T_b)$ and which are spaced closer together than $t_1$ and $t_2$, be defined using equations (10) and (11). If the first new set of thresholds $t_1$ and $t_2$ are insufficient for properly decoding the barcode, then one can try the second new set of threshold $t_1'$ and $t_2'$.

$$t_1' = T_b + \frac{(T_w - T_b)}{4} \quad (10)$$

$$t_2' = T_w - \frac{(T_w - T_b)}{4} \quad (11)$$

Figure 8:
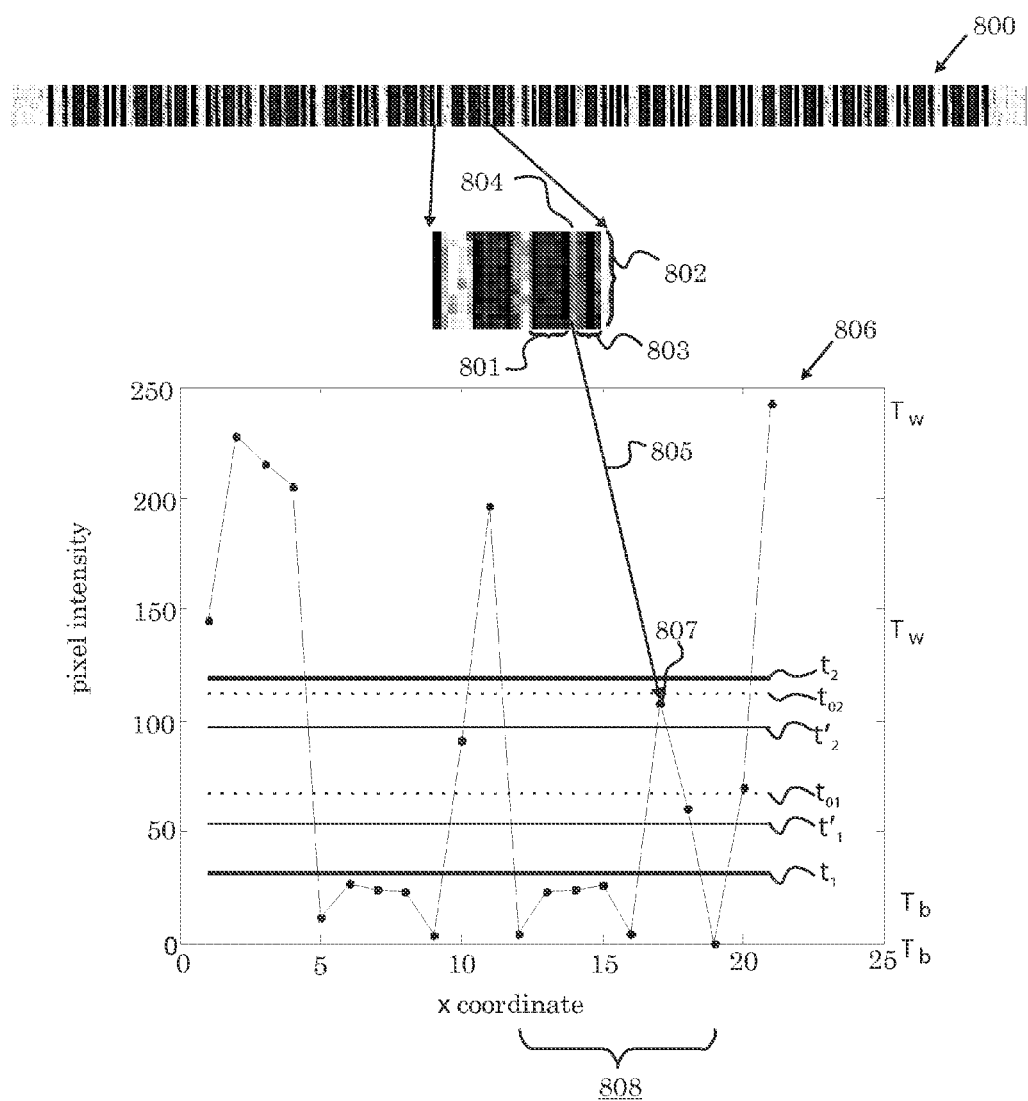
FIG. 8 is an illustration of a decoding failure.

FIG. 8 is an example of a decoding failure that an embodiment of the present invention may be used to remedy. FIG. 8 includes a barcode image 800. FIG. 8 also includes a zoomed-in portion 802 of some of the tokens from the barcode image 800. The last white space 804 within zoomed-in portion 802 is between two black bars 801 and 803. White space 804 is so dark and narrow that the original set of intensity thresholds $t0_1$ and $t0_2$ erroneously identify it as part of the two black bars 801 and 803. The present invention can be used to correctly identify such white spaces as white tokens.

FIG. 8 also includes a plot 806 of the intensity of decoded tokens within zoomed-in portion 802. The initial intensity thresholds $t0_2$ (having a value of 112) and $t0_1$ (having a value of 67) are shown with dashed lines. The first new set of thresholds $t_2$ (having a value of 119) and $t_1$ (having a value of 31) are shown with thick solid lines. The second new set of thresholds $t_2'$ (having a value of 97) and $t_1'$ (having a value of 53) are shown with thin solid lines.

Arrow 805 identifies the intensity point 807 corresponding to dark and narrow white space 802. As shown, its intensity point 807 is below the original upper intensity threshold, $t0_2$, and white space 804 is therefore erroneously identified as part of a black bar. Consequently the last two bars 801 and 803 that are separated by white space 804 are erroneously identified as one long black token 808 encompassing white space 804. This would imply that two tokens are missing from the decoding results, and thus signal a possible error.

It is noted that the first new set of thresholds $t_1$ and $t_2$ would also erroneously identifies white space 804 as part of a black bar since intensity point 807 is below upper threshold $t_2$. However, the second new set thresholds $t_1'$ and $t_2'$, which are proportional to the intensity contrast between the decoded white spaces and the decoded black bars $(T_w-T_b)$, would render correct data. In this case, intensity point 807 is above upper threshold $t_2'$, and would be correctly identified as a white space. Nonetheless, to double check this identification (and verify that a change from a black bar to a white space or from a white space to a black bar has occurred), the presently preferred method adds another checking sequence utilizing contrast threshold C. Basically, if the absolute value of the intensity difference between the current pixel and the previous currently decoded token is greater than contrast threshold C then the results of using the second new set thresholds $t_1'$ and $t_2'$ are accepted. Otherwise, they are rejected.

Thus, once the refinement procedure was used, this dark space dark and narrow white space 804 is correctly identified as a white token separated two black tokens, and a correct number of tokens is therefore provided in the final decoding results.

Re-Tokenization

The next step is to re-tokenize the pixels of the barcode candidate using five parameters $t_1$, $t_2$, $t_1'$, $t_2'$ and C, which are derived from the barcode candidate.

The barcode pixels may be re-scanned. Alternatively, previously scanned barcode pixels which were stored may be used in the re-tokenization process. The re-tokenization is done based on the pixel intensity and its contrast to the intensity of the previously determined token.

If j represents a current pixel being examined, $I^i$ represents the average intensity of the immediately previous token, and the intensity of current pixel j is represented as $I_j$, then current pixel j is deemed to be a black pixel if it satisfies equation (12).

$$[(I_j<t_1) \text{ OR } [(I_j<t_1') \text{ AND } ((I^i-I_j)>C)]] \quad (12)$$

Similarly, pixel j is deemed to be a white pixel if it satisfies equation (13).

$$(I_j > t_2) \text{ OR } [(I_j > t_1') \text{ AND } ((I_j - I^i) > C)] \quad (13)$$

Alternatively, a similar result may be obtained by classifying a current pixel j as a black pixel if $(\overline{P_j^i} < t_1) \vee (\overline{P_j^i} < t_1') \wedge (\overline{P_{max}^{i-1}} - \overline{P_j^i} > C)$, and classifying the current pixels as white pixel if $(\overline{P_j^i} > t_2) \vee ((\overline{P_j^i} > t_2') \wedge (\overline{P_j^i} - \overline{P_{min}^{i-1}} > C))$, where $\overline{P_{min}^{i-1}}$ and $\overline{P_{max}^{i-1}}$ are minimum and maximum intensities of the immediately previous token.

Contiguous sets of black pixels are grouped into black bars (i.e. black tokens). Contiguous sets of white pixels are grouped into white spaces (i.e. white tokens). A new black token is created if a black pixel is found following a white pixel, and a new white token is created if a white pixel is found followed by a black pixel.

The assigned intensity of a token is updated when a new pixel is added to it. If the token identifies a black bar, then the intensity of the darkest pixel in this black token is used to describe the intensity, $\overline{P_{min}^{i-1}}$, of the black token, as a whole. On the other hand, if the token identifies a white space then the intensity of the brightest pixel in this white token is used to describe the intensity, $\overline{P_{max}^{i-1}}$, of the white token, as a whole.

Some pixels may not be determined to be black or white based upon the rules stated in equations (12) and (13). The grouping of these pixels depends upon the similarity of their intensity to the pixels that have already been identified belonging to white or black tokens.

System

Figure 9:
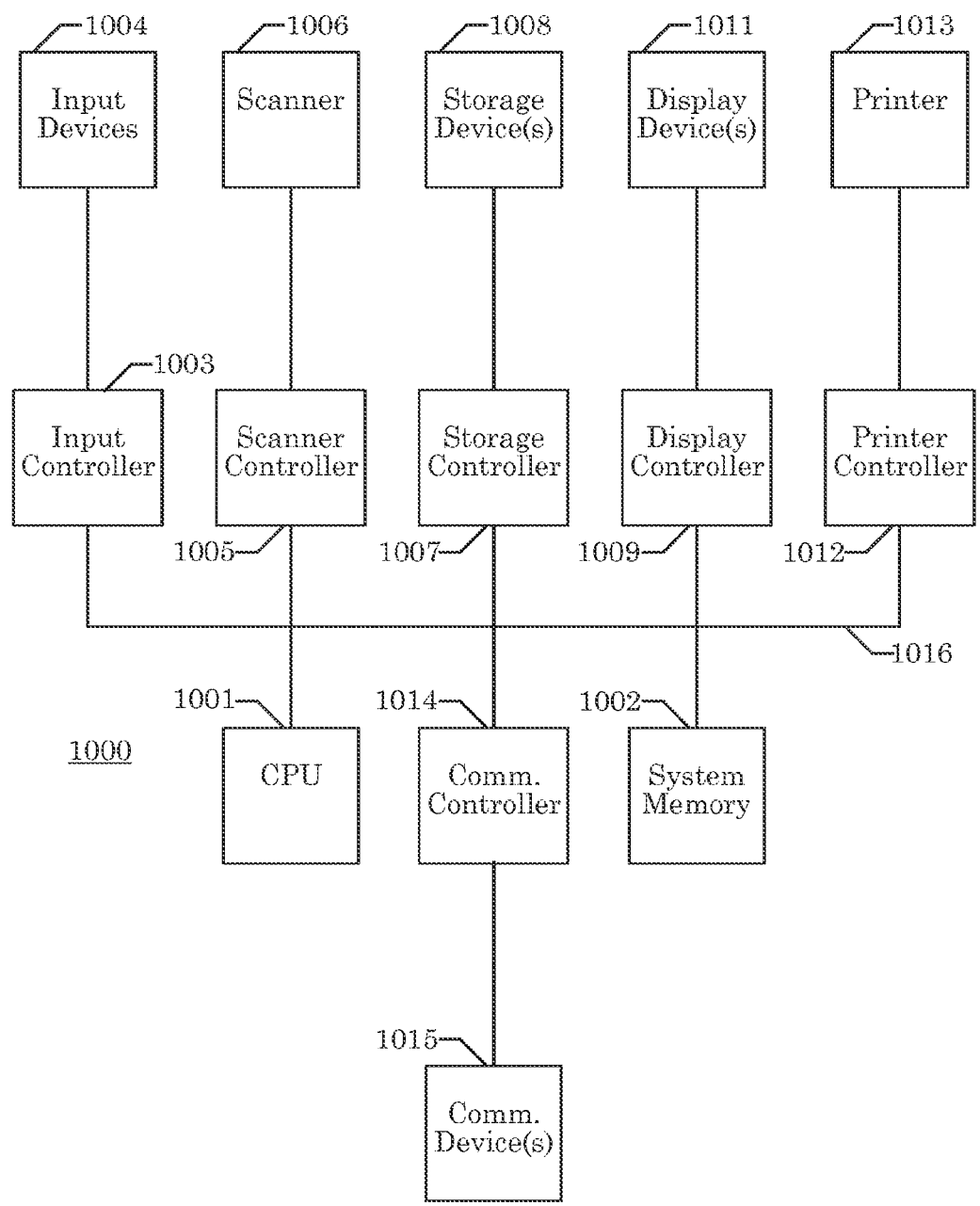
FIG. 9 is an illustration a system that may be used to perform an embodiment of the present invention.

Having described the details of the invention, an exemplary system 1000, which may be used to implement one or more aspects of the present invention, will now be described with reference to FIG. 9. As illustrated in FIG. 9, the system includes a central processing unit (CPU) 1001 that provides computing resources and controls the computer. The CPU 1001 may be implemented with a microprocessor or the like, and may also include a graphics processor and/or a floating point coprocessor for mathematical computations. The system 1000 may also include system memory 1002, which may be in the form of random-access memory (RAM) and read-only memory (ROM).

A number of controllers and peripheral devices may also be provided, as shown in FIG. 9. An input controller 1003 represents an interface to various input device(s) 1004, such as a keyboard, mouse, or stylus. There may also be a scanner controller 1005, which communicates with a scanner 1006. The scanner may be used to scan bar codes. The system 1000 may also include a storage controller 1007 for interfacing with one or more storage devices 1008 each of which includes a storage medium such as magnetic tape or disk, or an optical medium that might be used to record programs of instructions for operating systems, utilities and applications which may include embodiments of programs that implement various aspects of the present invention. Storage device(s) 1008 may also be used to store processed data or data to be processed in accordance with the invention. The system 1000 may also include a display controller 1009 for providing an interface to a display device 1011, which may be a cathode ray tube (CRT), or a thin film transistor (TFT) display. The display may be used to present data associated with the bar code. The system 1000 may also include a printer controller 1012 for communicating with a printer 1013. The printer may be used to print data associated with the bar code. A communications controller 1014 may interface with one or more communication devices 1015 which enables the system 1000 to connect to remote devices through any of a variety of networks including the Internet, a local area network (LAN), a wide area network (WAN), or through any suitable electromagnetic carrier signals including infrared signals. The system may also include a cash register.

In the illustrated system, all major system components may connect to a bus 1016, which may represent more than one physical bus. However, various system components may or may not be in physical proximity to one another. For example, input data and/or output data may be remotely transmitted from one physical location to another. In addition, programs that implement various aspects of this invention may be accessed from a remote location (e.g., a server) over a network. Such data and/or programs may be conveyed through any of a variety of machine-readable medium including magnetic tape or disk or optical disc, or a transmitter, receiver pair.

The present invention may be conveniently implemented with software. However, alternative implementations are certainly possible, including a hardware implementation or a software/hardware implementation. Any hardware-implemented functions may be realized using ASIC(s), digital signal processing circuitry, or the like. Accordingly, the "means" terms in the claims are intended to cover both software and hardware implementations. Similarly, the term "computer-readable medium" as used herein includes software and or hardware having a program of instructions embodied thereon, or a combination thereof. With these implementation alternatives in mind, it is to be understood that the figures and accompanying description provide the functional information one skilled in the art would require to write program code (i.e., software) or to fabricate circuits (i.e., hardware) to perform the processing required.

In accordance with further aspects of the invention, any of the above-described methods or steps thereof may be embodied in a program of instructions (e.g., software), which may be stored on, or conveyed to, a computer or other processor-controlled device for execution on a computer-readable medium. Alternatively, any of the methods or steps thereof may be implemented using functionally equivalent hardware (e.g., application specific integrated circuit (ASIC), digital signal processing circuitry, etc.) or a combination of software and hardware.

While the invention has been described in conjunction with several specific embodiments, it is evident to those skilled in the art that many further alternatives, modifications and variations will be apparent in light of the foregoing description. Thus, the invention described herein is intended to embrace all such alternatives, modifications, applications and variations as may fall within the spirit and scope of the appended claims.

What is claimed is:

1. A method of decoding an image of a barcode comprising the following steps:
   (a) tokenizing a plurality of pixels in the image of the barcode based upon at least an initial fixed set of intensity thresholds to form a first set of tokens, said first set of tokens including white tokens identifying decoded white spaces in the image and black tokens identifying decoded black bars in the image;
   (b) re-tokenizing the plurality of pixels in the image of the barcode based upon a first new set of thresholds determined from the intensity of pixels in the first set of tokens, and the relative intensity of one of its neighboring re-tokenized tokens, to form a second set of tokens;

validating that the first set of tokens represents a valid barcode, and only re-tokenizing the plurality of pixels if the barcode is valid; and wherein said validating includes verifying that the image of the barcode meets a plurality of criteria, said criteria including a vertical intensity variability of each token; a between token contrast level; and a total vertical intensity of the barcode.

2. The method of claim 1, in which the plurality of first intensity thresholds is independent of the intensity of pixels in the image of the barcode.

3. The method of claim 1, further comprising in step (b):
(i) identifying the brightest pixel in each of the white tokens;
(ii) identifying the darkest pixel in each of the black tokens;
(iii) defining a first new upper threshold, $t_2$, to be a fixed amount lower than an upper reference, $T_w$, defined as the darkest pixel among said brightest pixels;
(iv) defining a first new lower threshold, $t_1$, to be a fixed amount higher than a lower reference, $T_b$, defined as the brightest pixel among said darkest pixels, said first new upper threshold and new lower threshold forming said first new set of thresholds;
wherein said first new set of thresholds are used in said re-tokenizing of the plurality of pixels in the image of the barcode.

4. The method of claim 3, wherein said re-tokenizing the plurality of pixels in the image of the barcode is further based upon a second new set of thresholds determined from the intensity of pixels in the first set of tokens;
said second set of thresholds including a second new upper threshold, $t_2'$, defined as the upper reference $T_w$ less said first predefined fraction of the intensity difference between the upper reference $T_w$ and the lower reference $T_b$; and
said second set of thresholds including a second new lower threshold, $t_1'$, defined as the lower reference $T_b$ plus a first predefined fraction of the intensity difference between the upper reference $T_w$ and the lower reference $T_b$.

5. The method of claim 4, in which re-tokenizing further comprises:
defining a first contrast threshold, C, as a second predefined fraction of the intensity difference between the upper reference $T_w$ and the lower reference $T_b$; and
comparing an intensity difference between a particular pixel and an assigned intensity of a neighboring token, to said first contrast threshold C.

6. A non-transitory computer-readable medium encoded with instructions for performing the method recited in claim 1.

7. A system that includes a processor and memory for performing the method recited in claim 1.

8. The system of claim 7, further comprising a scanner for obtaining the image of the barcode.

9. A method for decoding a barcode comprising:
identifying a barcode candidate within an image consisting of an array of pixels;
tokenizing the array of pixels into a plurality of initial black tokens and a plurality of initial white tokens using a plurality of initial thresholds, wherein a plurality of initial tokens consists of the initial black tokens and the initial white tokens;
identifying an intensity of the darkest pixel among the brightest pixel in each of the plurality of initial white tokens as a first tokenization parameter, $T_w$;
identifying an intensity of brightest pixel among the darkest pixel in each of the plurality of initial black tokens as a second tokenization parameter, $T_b$;
calculating a tokenization contrast parameter, C, that is proportional to two-thirds of the difference between the first tokenization parameter $T_w$ and the second tokenization parameter $T_b$;
calculating a third tokenization parameter, $t_1$, as equal to a first fixed amount higher than the second tokenization parameter, $T_b$;
calculating a fourth tokenization parameter, $t_2$, as equal to a second fixed amount lower than the first tokenization parameter $T_w$;
calculating a fifth tokenization parameter, $t_2'$, as equal to the sum of 0.75 times the first tokenization parameter $T_w$ and 0.25 times the second tokenization parameter $T_b$;
calculating a sixth tokenization parameter $t_1'$ as equal to the sum of 0.25 times the first tokenization parameter $T_w$ and 0.75 times the second tokenization parameter $T_b$;
identifying a pixel as a black pixel if an intensity of the pixel is less than the third tokenization parameter $t_1$ or if the intensity of the pixel is less than the sixth tokenization parameter $t_1'$ and a difference between the intensity of the previous token and the intensity of the pixel is greater than the tokenization contrast parameter C; and
identifying a pixel as a white pixel if an intensity of the pixel is greater than the fourth tokenization parameter $t_2$ or if the intensity of the pixel is greater than the fifth tokenization parameter $t_2'$ and difference between the intensity of the previous token and the intensity of the pixel is greater than the tokenization contrast parameter C.

10. A non-transitory computer-readable medium encoded with instructions for performing the method recited in claim 9.

11. A system that includes a processor and memory for performing the method recited in claim 9.

12. The system of claim 11, wherein the third tokenization parameter, $t_1$, is lower than the sixth tokenization parameter $t_1'$, and the fourth tokenization parameter, $t_2$, is higher than the fifth tokenization parameter, $t_2'$.

* * * * *